Aug. 18, 1942.  E. R. DUDLEY, JR  2,293,121
FRUIT TURNING AND CENTERING DEVICE
Filed March 6, 1940  3 Sheets-Sheet 1

INVENTOR
EDMOND R. DUDLEY, JR.
BY
ATTORNEY

Aug. 18, 1942.   E. R. DUDLEY, JR   2,293,121
FRUIT TURNING AND CENTERING DEVICE
Filed March 6, 1940   3 Sheets-Sheet 2
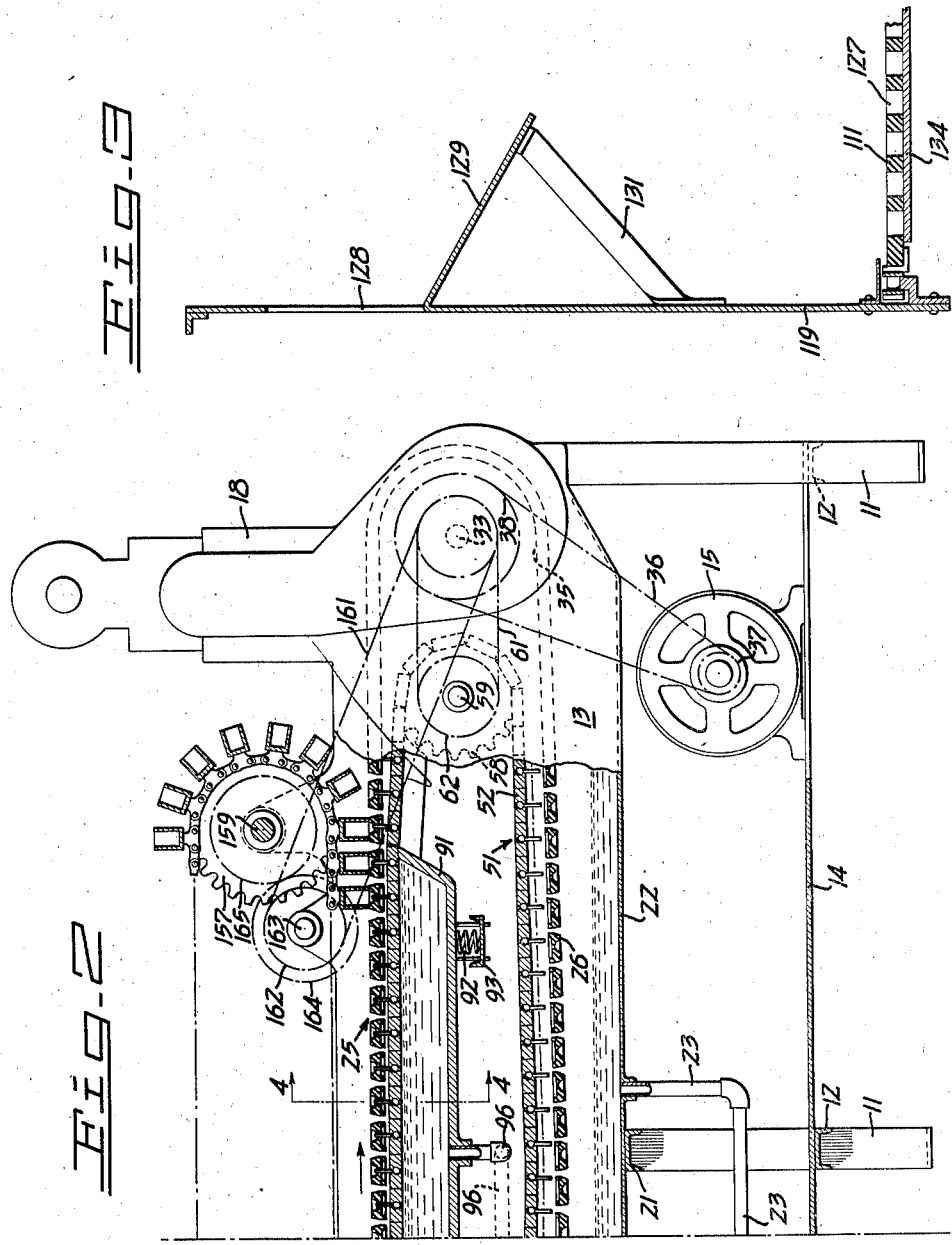
INVENTOR
EDMOND R. DUDLEY, JR.
BY
ATTORNEY Aug. 18, 1942.                E. R. DUDLEY, JR                    2,293,121
                    FRUIT TURNING AND CENTERING DEVICE
                    Filed March 6, 1940           3 Sheets-Sheet 3
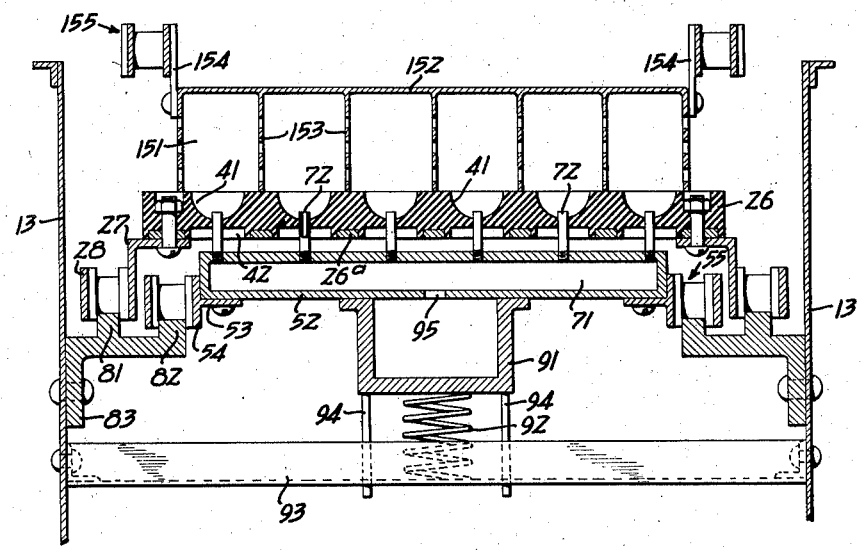
Fig.4
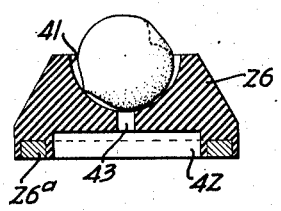   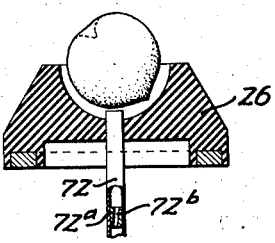   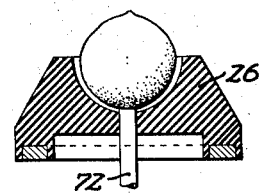
Fig.5           Fig.6           Fig.7
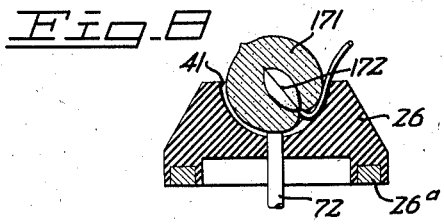   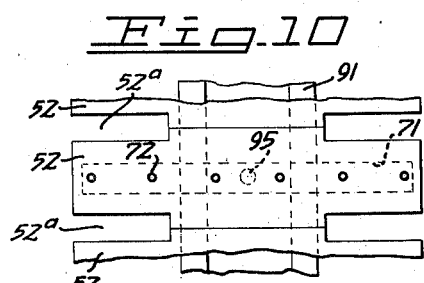
Fig.8           Fig.10
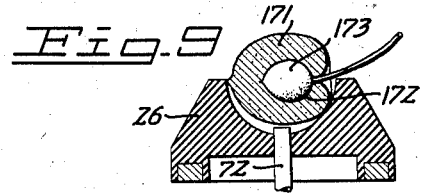
Fig.9
INVENTOR
EDMOND R. DUDLEY, JR.
BY
ATTORNEY Patented Aug. 18, 1942

2,293,121

UNITED STATES PATENT OFFICE 2,293,121

FRUIT TURNING AND CENTERING DEVICE

Edmond R. Dudley, Jr., Napa, Calif., assignor of one-fourth to Le Roy Hanscom, Berkeley, Calif.

Application March 6, 1940, Serial No. 322,467

10 Claims. (Cl. 198—33)

This invention relates to automatic cherry pitters and particularly to means for automatically positioning the cherries with respect to their axes prior to the actual pitting operation.

All cherries are formed with a depression at their stem ends concentric with the axes of the cherries, the pulp of the cherries and the pits being substantially co-axial. Most cherries have two relatively flat opposed sides, the suture or rib of the pits ordinarily lying in a plane perpendicular to these relatively flat sides. Royal Anne cherries, the variety most commonly used for making maraschino cherries, have exceptionally flat pits, advantage of which may be taken in pitting them.

For most purposes it is immaterial through which side of the cherry the pit is removed. However in making maraschino cherries a symmetrical product of pleasing appearance is desired, and therefore it is essential to remove the pits of these cherries in some predetermined and uniform manner.

In general, the object of this invention is the provision of fluid operated means for turning cherries on an endless conveyor so that prior to coming into registration with the pitting knives or plungers they assume a position either with their stems downwardly directed or with their flat sides lying in planes perpendicular to the line of travel of the pitting knives.

More specifically, the object of this invention is the provision of an endless conveyor having cherry-receiving recesses through which jets of water or other fluid may be forced either for the purpose of turning the cherries accommodated within such recesses until the stem ends of the cherries assume a downwardly directed position or for the purpose of turning the cherries with their flat sides perpendicular to the line of travel of the pitting knives.

Another object of this invention is the provision, in combination with an endless conveyor formed with cherry-receiving recesses, of fluid means for turning the cherries in said recesses and of fluid means for effecting a downwardly directed differential pressure on said cherries when their stem ends have been disposed in a downwardly directed position.

The invention possesses other advantageous features, some of which with the foregoing will be set forth at length in the following description where that form of the invention which has been selected for illustration in the drawings accompanying and forming a part of the present specification is outlined in full. In said drawings, one form of the invention is shown, but it is to be understood that it is not limited to such form, since the invention as set forth in the claims may be embodied in a plurality of forms.

Referring to the drawings:

Figure 2 is a similar section of the discharge or pitting end of the pitter shown in Figure 1.

Figure 3 is an enlarged section taken on the line 3—3 of Figure 1.

Figure 4 is an enlarged section taken on the line 4—4 of Figure 2.

Figure 5 is an enlarged section of one of the conveyor elements showing a cherry accommodated within one of its recesses prior to the turning operation.

Figure 6 is a section similar to that shown in Figure 5 but showing the cherry during the turning operation.

Figure 7 is likewise a section similar to that shown in Figure 5 but showing the cherry after the turning operation has been completed, with its stem end downwardly directed.

Figure 8 is a section taken through a cherry-receiving cup with a cherry shown in the act of being turned to one of its flat sides so that its pit can be removed without the removal of its stem.

Figure 9 is a section similar to that shown in Figure 8 but with the cherry supported at its stem and flower ends across the cherry-receiving cup and with its relatively flat sides lying horizontal.

Figure 10 is a top plan view of one of the bars used in the execution of my invention.

Figure 1:
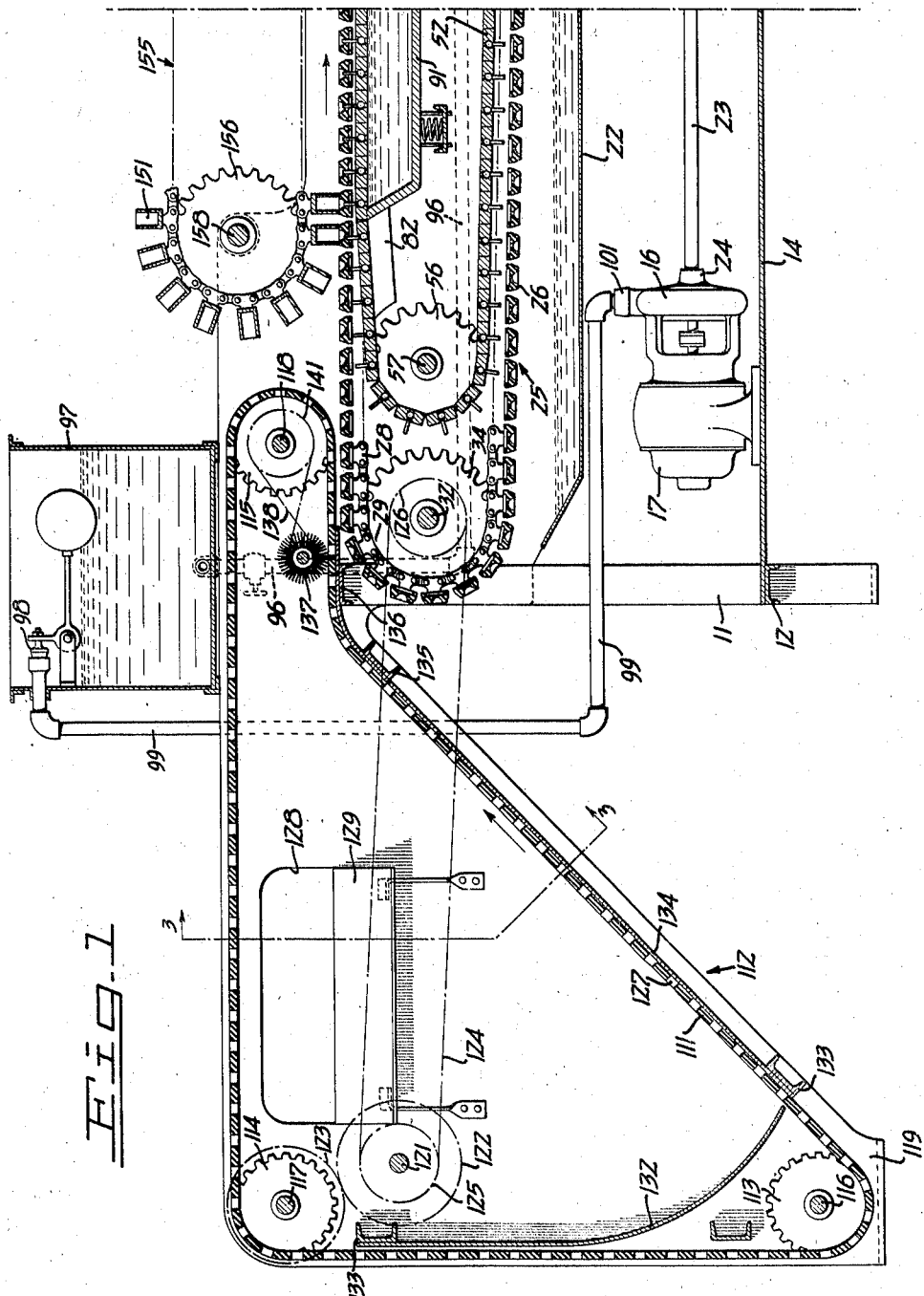
Figure 1 is a longitudinal mid-vertical section of the feed end of a cherry pitter embodying the objects of my invention and shown associated with a feed hopper.

I have found that if a cherry, regardless of the location of its stem end, is placed in a cup or recess of slightly larger diameter than the cherry, as shown in Figure 5, and then a jet of water or other fluid under a head of from three to six inches of water is introduced upwardly against the cherry through a small nipple extending slightly into the cup or recess as shown in Figure 6, the jet of water will cause the cherry to turn or dance within the recess until it finally assumes the position shown in Figure 7 with its stem end depression surrounding the protruding end of the nipple. When in this position there is for some reason or other very little atmospheric pressure transmitted to the lower face of the cherry, for it is held in place by a downwardly directed differential atmospheric pressure equivalent to some twenty-four inches of water.

This is readily demonstrated by permitting the cherry as above explained to assume the position shown in Figure 7 and then increasing the pressure of the water jet until the cherry is unseated. The column of water resulting from this jet will be found to be between twenty-four and thirty-six inches high. This action therefore affords a very convenient method of automatically turning and centering cherries so that their pits can be removed through their stem ends by a pitter such as for example shown in the Ashlock Patent No. 2,157,518 of May 9, 1939.

As shown in the various figures above described, this principle has been embodied in an automatic machine comprising a generally rectangular frame or table formed with legs 11, cross members 12 and sides 13.

Supported by and extending between the cross members 12 is a shelf 14 on which is mounted a motor 15 and a water pump 16 driven by a motor 17. Carried by the right hand end of the table as shown in Figure 2 is a cherry pitter 18 which per se, and except in the combination herein described, forms no part of the present invention and which may conveniently be made in accordance with the disclosure of the Ashlock patent above referred to.

Supported by a cross-member 21 and formed integral with the sides 13 is a water pan 22 communicating through suitable piping 23 with the intake 24 of the pump 16. Mounted above the pan 22 is an endless conveyor or carrier generally designated by the reference numeral 25 and comprising a plurality of parallel transversely extending bars 26. The bars 26 are secured at their ends by lugs 27 to the outer links 28 of a pair of spaced link belts or chains generally designated by the reference numeral 29. Journaled in the sides 13 at each end of the table are shafts 32 and 33, and keyed to each of these shafts is a pair of transversely spaced sprocket wheels 34 and 35 on which the link belts 29 are carried. As indicated in Figure 2, the shaft 33 is driven by the motor 15 through a belt 36 passing over pulley wheels 37 and 38 associated respectively with the motor 15 and the shaft 33.

The bars 26 may be molded of rubber, each bar being provided on its upper face as shown in Figure 4 with a plurality of transversely aligned hemispherical cherry-receiving recesses or cups 41 and on its lower face with cylindrical counterbores or recesses 42. Embedded in each bar is a steel or brass stiffening member 26$^a$. Establishing communication between each cherry-receiving recess 41 and its associated recess 42 is a circular aperture 43 having its axis in alignment with the center of the recess 41.

Traveling within and in partial registration with the endless carrier 25 is a nipple carrier generally designated by the reference numeral 51 and comprising a plurality of transverse parallel bars 52 secured at their ends by lugs 53 to the outer links 54 of transversely spaced endless link belts generally designated by the reference numeral 55. Each of the belts 55 meshes at one end with a sprocket wheel 56 keyed to a shaft 57 carried by the sides 13, and at its opposite end with a similar sprocket wheel 58 keyed to a shaft 59. The shaft 59 is carried by the sides 13 and is driven in synchronism with the carrier 26 by a belt 61 passing over a pulley wheel 62 keyed to this shaft and over a corresponding pulley wheel keyed to the shaft 33.

Each of the bars 52 is formed with a transversely extending central channel or manifold 71 and communicating with this channel are a plurality of upwardly extending transversely spaced nipples 72 threaded or otherwise secured to the upper face of the bar. As best shown in Figure 6, each nipple 72 is provided with a reducer or plug 72$^a$ formed with an angularly disposed restricted orifice 72$^b$. This orifice is angularly disposed so as to cause the stream of water passing through it to impinge upon the walls of the nipple rather than directly upon the cherry. The spacing of the nipples should be identical with the spacing of the apertures 43 formed in the bars 26 so that upon registration of the carriers 25 and 51 the upper ends of the nipples may be made to extend through the apertures 43 into the cherry-receiving cups or recesses 41 as shown in Figures 1, 4, 6, and 7. The width of the bars 52 should be such that except when passing over their associated sprocket wheels, their sides will abut and form a substantially water-tight seal. For this reason these bars should be accurately machined and preferably covered with rubber. To permit water to pass through the nipple carrier 51, each of the bars 52 is formed with notches 52$^a$. As shown in Figures 1 and 2, the longitudinal spacing of adjacent nipples 72 is identical with the spacing of the longitudinally adjacent cherry-receiving recesses 41 so that adjacent nipples have registration longitudinally as well as transversely with their corresponding cherry-receiving recesses. The length of the nipples and the distance between the upper spans of the endless carriers should be such that the nipples when in their operative position extend slightly into the cherry-receiving recesses without preventing the stem end of the cherries from seating over the ends of the nipples on the base of the recesses 41.

Registration of the two carriers 25 and 51 over a portion of their travel as shown in Figures 1, 2, and 4 is effected by means of guides 81 and 82 carried by brackets 83 secured to the sides 13 and disposed beneath the upper portion of each of the four link belts.

Disposed beneath the upper portion of the nipple carrier 51 is a longitudinally extending channel-shaped water manifold 91 resiliently held against the lower faces of the bars 52 by springs 92 resting on cross members 93 carried by the sides 13. Lateral and longitudinal displacement of the manifold 91 is prevented by vertical guide rods 94 secured to the manifold with their lower ends passing through apertures formed in the cross members 93 as shown in Figures 1, 2, and 4. Since a substantially water-tight seal should exist between the manifold 91 and the bars 52 passing over and in contact with the manifold, all contacting surfaces should preferably be rubber covered and accurately finished, and the contour of the guides 81 and 82 should be such that the bars 52 form a flat bed when passing over the manifold 91.

Communication between the manifold 91 and the transverse manifolds 71 of each of the bars 52 is established by apertures 95 formed in the lower wall of each of these bars.

The manifold 91 as shown in Figures 2 and 1 communicates through suitable piping 96 with a water supply tank 97 and may therefore be subjected to a constant water head, preferably such that the pressure of the water passing through the nipples 72 is equal to about three to six inches of water. The tank 97 communicates through a float operated valve 98 and suitable piping 99 with the discharge side 101 of the pump 16. It will therefore be seen that the water passing upwardly through the nipples 72 spills over the sides of the bars 26, through the notches 52a formed in the bars 52 into the pan 22 and is then returned to the tank 97 for further use.

As shown in Figure 1, cherries are delivered to each one of the recesses 41 of the carrier 25 through an endless conveyor belt 111 forming a part of a cherry hopper 112. This belt may be conveniently carried on either side by a link belt or chain in mesh with sprocket wheels 113, 114 and 115 keyed respectively to shafts 116, 117 and 118 journaled in the sides 119 of the hopper 112. Also journaled in the sides 119 is a shaft 121 to which is keyed a gear 122 in mesh with a gear 123 keyed to the shaft 117. The shaft 121 is driven by a belt 124 passing over a pulley wheel 125 keyed to the shaft 121 and over a similar pulley wheel 126 keyed to the shaft 32. Formed in the conveyor 111 are a plurality of circular apertures 127 of a diameter substantially equal to the diameter of the cherry-receiving recesses 41 and large enough to accommodate cherries with their stems attached. The apertures 127 are transversely and longitudinally aligned exactly to register with the recesses 41 over the area in which the lower span of the conveyor 111 overlaps the upper span of the carrier 25; and the conveyor 111 and carriers 25 and 51 are driven in synchronism with each other for the same reason.

Cherries are delivered to the hopper 112 through an opening 128 formed in one of the sides 119 and are deflected to the central portion of the hopper by an inwardly directed plate 129 supported at its lower end by a brace 131. To prevent the cherries from coming in contact with the sprocket wheels 113 in the lower apex of the hopper, a guard 132 secured at either end to cross members 133 is disposed within the hopper at this point. Secured below and in contact with the lower span of the conveyor 111 is a plate 134 carried by one of the cross members 133 and by the cross members 135 and 136. This plate therefore prevents cherries from passing through the apertures 127 until they have reached a point above the carrier 25 in registration with the recesses 41. Mounted to rotate in contact with the conveyor 111 is a brush 137 driven by a belt 138 passing over a pulley 141 keyed to the shaft 118. This brush insures that cherries carried upwardly by the conveyor 111 are lodged within the apertures 127.

In some cases the action of the jets passing through the nipples 72 is sufficient to cause the cherries to jump their respective recesses and to avoid this a perforated guard or cup 151 is provided over each recess 41. These guards may, as best shown in Figures 1, 2, and 4, take the form of rectangular shells 152 provided with spaced partitions 153. Each shell is secured on either side to a lug 154 carried by a link of a link belt 155 passing over sprocket wheels 156 and 157. These sprocket wheels are keyed to shafts 158 and 159 journaled in the sides 13. The shaft 159 is driven by a belt 161 passing over a pulley wheel keyed to the shaft 33 and over a pulley wheel 162 carried by a shaft 163 journaled in the sides 13. Keyed to the shaft 163 is a gear 164 in mesh with a gear 165 keyed to the shaft 159. The gear ratios of all of the gears and pulleys used are such that the guards 151 travel in synchronism with the carrier 25.

As indicated in Figure 2, the carrier 25 forms a part of and passes through the pitter 18 wherein the cherries carried by and centered in the recesses 41 are pitted by the action of plungers or knives in the manner set forth in the Ashlock patent above referred to.

The machine as above described operates as follows:

Cherries fed to the hopper 112 become lodged in the apertures 127 of the conveyor 111 and are delivered to the carrier 25 in registration with the recesses 41. Upon the continued advance of the carrier 25 in synchronism with the nipple carrier 51, the nipples 72 come into registration with the apertures 43, extending slightly into the recesses 41. The apertures 95 of the nipple bars 52 then pass over the end of the manifold 91, thereby permitting water under a hydrostatic head of three to six inches to pass through the manifold 71 of the nipple bars and through the nipples 72 against the lower surface of the cherries. The cherries are thereby caused to dance about within the recesses 41 and within a period of several seconds become seated with their stem ends recessed over the ends of the nipples 72 as above described. The water passing through the nipples and around the cherries falls by gravity through the spaces between the bars 26 and through the lateral openings or notches 52a in the bars 52 into the pan 22 and from there is pumped into the tank 97 for further use. Communication between each of the nipple bars 52 and the manifold 91 is of course cut off as each bar passes over the right hand end of the manifold. The centered cherries then pass on to the pitter for the pitting operation.

In making maraschino cherries for cocktails it is sometimes desirable to leave the stems in place and therefore cherries for this purpose should be pitted through their flat sides. To accomplish this result, the machine as above described can be used by simply decreasing the extent to which the ends of the nipples 72 extend into the recesses 41 and by decreasing the pressure of the water passing therethrough to two or three inches of water. As shown in Figures 8 and 9, the nipples 72 should be so adjusted that in their operative position they extend about $\frac{1}{32}''$ or $\frac{1}{16}''$ above the floor of the recesses 41 rather than $\frac{1}{8}''$ as previously described.

As shown in Figure 8, the cherry 171 has assumed a position with its flat sides parallel to the plane of the paper and with the sharp edge or suture 172 of its pit 173 lying in a plane perpendicular to the plane of the paper. The action of the water passing through the nipple 72 floats the cherry, causing it to turn and assume the position as shown in Figure 9 with its stem and flower ends supported by the sides of the recess 41 and with its relatively flat sides lying in horizontal planes, that is, in planes perpendicular to the nipple 72. In this position the sharp edge or suture 172 of the pit 173 lies in a vertical plane and consequently the pit (due to the action of the pitting knife or plunger) may be made to cut a slit through the lower wall of the cherry rather than punching out a cylinder or disc of cherry flesh. To obtain this action it is important that the lower side of the cherry immediately above the aperture 43 be unsupported so that the central portion of the cherry can be depressed to a slight extent.

From this description it will be noted that, depending upon the water pressure used and the level of the nipple 72 above the bottom of the cups or recesses 41, my device can be used to automatically turn cherries so that their stem ends are downwardly directed or so that their flat sides lie in planes perpendicular to the axis of the cups or recesses 41.

For upending the cherries a slightly greater fluid pressure and a longer interval of time are required than for turning them on their sides. The exact pressure required in each instance can be readily determined by experimentation, and for this purpose a three inch head can be used as a starting point. Cherries can be upended in from one to ten seconds and can be turned on their flat sides in about one second. In upending cherries a nipple extending upwardly into the cup is essential whereas in turning cherries on their sides a short nipple is desirable but not necessary. The nipple may be made integral with the cup or as shown in the drawings made as a separate unit arranged to register with the opening in the cup.

The restricted orifice 72$^b$ associated with each of the nipples is highly desirable, for it causes a greater differential pressure on either end of the nipple, insuring the turning of the cherry. To obtain a current or jet or fluid of a predetermined pressure passing through the discharge end of the nipple, it is of course necessary to have a greater pressure at the intake end of the nipple with the use of a restricted orifice than without the use of such an orifice. When therefore a cherry obstructs the nipple outlet, the back pressure which it creates does not materially alter the pressure at the intake side of the nipple. Consequently the pressure on the discharge end is immediately built up to a point where the cherry is turned. Without the use of a restricted orifice there is not a sufficient differential pressure between the two ends of the nipple to bring about this action. A further need for a restricted orifice results from the fact that one water manifold is used to feed several cups and that in some cases one or more of these cups may not have a cherry in them. By the use of a restricted orifice the absence of one or more cherries does not appreciably alter the pressure on the cherries accommodated in the remaining cups and consequently they are subjected to a substantially uniform action regardless of the absence of one or more cherries.

While my invention has been described with particular reference to cherries, other fruit may be centered in the same manner, and fluids other than water may be used as the operating medium.

I claim:

1. A fruit turning device comprising: a fruit-supporting member having an opening extending therethrough; means for maintaining a fruit substantially centered over said opening; and means for causing a jet of fluid to pass upwardly through said opening into contact with said fruit, said jet being under sufficient pressure to cause the fruit to turn within the cup.

2. A fruit turning device comprising: a fruit-receiving cup slightly greater in diameter than the fruit which it is designed to accommodate; a central opening extending through the base of said cup; and means for causing a jet of fluid to pass upwardly through said opening under sufficient pressure to cause said fruit to turn within said cup.

3. A fruit turning device comprising: a fruit-supporting member; a nipple extending through said supporting member; means for maintaining a fruit substantially centered over said nipple; and means for causing a current of fluid to pass upwardly through said nipple.

4. A fruit turning device comprising: an endless fruit conveyor; a series of longitudinally aligned and equally spaced fruit-receiving cups carried by said conveyor, and each formed with a central opening in its bottom; an endless nipple conveyor mounted for travel within and in synchronism with said fruit conveyor; a series of longitudinally aligned and equally spaced nipples carried by said nipple conveyor and arranged to extend through the central openings in the bottoms of said cups during a portion of the travel of said fruit conveyor; and means for successively establishing communication between said nipples and a source of fluid during a portion of the time that said nipples extend through said openings.

5. A fruit turning device comprising: an endless conveyor formed with a plurality of longitudinally spaced fruit-receiving cups of generally hemispherical form; a nipple-receiving aperture formed in the bottom of each of said cups; a second endless conveyor arranged to travel within and in synchronism with said first mentioned endless conveyor; longitudinally spaced nipples carried by said second conveyor, arranged to register with said apertures during a portion of the travel of said endless conveyors; and means for causing a current of fluid to pass upwardly through said nipples while they are in registration with said apertures.

6. A fruit turning device comprising: an endless fruit conveyor; a series of longitudinally aligned, equally spaced fruit-receiving cups carried by said conveyor and each formed with a central opening in its bottom; an endless nipple conveyor mounted for travel within and in synchronism with said fruit conveyor; a series of longitudinally aligned and equally spaced nipples carried by said nipple conveyor and arranged to extend through the central openings in the bottoms of said cups during a portion of the travel of said fruit conveyor; a fluid chamber disposed within the locus of said nipple carrier; and means for successively establishing communication between each of said nipples and said fluid chamber.

7. A fruit turning and centering device comprising: an endless fruit-turning conveyor formed with a plurality of longitudinally spaced fruit-receiving cups; a central aperture formed in the bottom of each cup; a nipple arranged to register with each of said cups during a portion of the travel of said conveyor; means for causing a current of fluid to pass upwardly through said nipples during such registration and for turning and centering the said fruit; and a feed conveyor formed with longitudinally spaced fruit-receiving pockets arranged to register with said cups during a portion of the travel of said fruit-turning conveyor.

8. A fruit turning and centering device comprising: a fruit-receiving cup slightly greater in diameter than the fruit which it is designed to accommodate; an upwardly extending nipple associated with the bottom of said cup; and means for causing a current of fluid to pass upwardly through said nipple under sufficient pressure to cause said fruit to be oriented within said cup with its axis coincident with the axis of said cup.

9. A fruit turning and centering device comprising: a fruit-supporting member formed with a generally hemispherical fruit-receiving cup; and means for orienting said fruit within said cup with the axis of the fruit substantially coincident with the axis of the cup, comprising a nipple associated with the bottom of the cup, and means for causing a slowly flowing current of fluid to pass upwardly through said nipple.

10. A fruit turning and centering device comprising: a fruit-supporting cup arranged to travel in a closed path; and means for orienting said fruit within said cup with its axis substantially coincident with the axis of the cup, comprising a nipple associated with the bottom of said cup, and means operable during a portion of the travel of said cup to cause a slowly flowing current of fluid to pass upwardly through said nipple.

EDMOND R. DUDLEY, Jr.